Patented Nov. 24, 1953

2,660,599

UNITED STATES PATENT OFFICE 2,660,599

CATALYTIC HYDROGENATION OF CARBON MONOXIDE

Walter Rottig, Oberhausen-Sterkrade-Nord, Germany, assignor to Ruhrchemie Aktiengesellschaft, Oberhausen-Holten, Germany, a joint stock company of Germany No Drawing. Application November 16, 1949, Serial No. 127,795

Claims priority, application Germany May 7, 1949

2 Claims. (Cl. 260—449.6)

This invention relates to the catalytic hydrogenation of carbon monoxide and more especially to a method of hydrogenation which leads to the formation of a high percentage of oxygen containing compounds.

As is well known to those skilled in the art, the reaction occurring in the presence of iron catalysts in gas mixtures containing carbon monoxide and hydrogen results in the formation of products which contain, besides hydrocarbons, also a certain percentage of carbon compounds containing oxygen. These oxygen compounds mainly are alcohols, acids, esters, aldehydes, ketones and similar compounds.

There is a great demand in industry for such compounds containing oxygen and more particularly for alcohols and esters which may serve as starting materials or auxiliary materials in the production of organic substances, as auxiliary substances for the textile industry, as softeners, solvents or auxiliary materials for paper manufacture, and so on.

I have now found that the percentage of carbon compounds containing oxygen, and more especially of esters and alcohols, which are formed in the catalytic hydrogenation of carbon monoxide, can be increased considerably if the hydrogenation is carried through under a pressure above atmospheric but considerably below 50 and preferably from 10–50 kg./sq. cm. and temperatures from approximately 190° C. to 320° C. in the presence of a special kind of precipitated alkalized iron catalysts containing from .5 to 10% and, preferably from 2 to 5% alkali, calculated for $K_2O$, in the form of alkali compounds of a non-volatile acid, preferably potassium salts of phosphoric, silicic, boric, tungstic, molybdic and other acids. In the process thus defined the ratio between the alkali content and the acid radical of the alkali salt should be such that for 1 mol $K_2O$ approximately .3 to 3.0 mols of the acid radical are present. The $K_2O$ content is calculated in percents of the iron content.

It is surprising to see that with iron catalysts alkalized as described above, which under atmospheric pressure only lead to an increased yield of paraffin and to a reduction of the formation of methane, under pressures above atmospheric a considerably increased yield of alcohols, esters and similar carbon compounds containing oxygen can be obtained, such as never before was noticed in the catalytic hydrogenation of carbon monoxide.

The iron catalyst according to this invention before being used in the hydrogenation process, preferably should be subjected to a preparatory treatment with reducing gases, for instance with hydrogen, carbon monoxide or mixtures of the two, to such an extent that the reduction value of the catalyst, i. e. its content of metallic iron, amounts to at least 40 to 45% of the total iron content. Particularly high yields of compounds containing oxygen are however obtained if the catalysts are reduced so far that the percentage of free iron amounts to more than 60, and preferably to more than 80% of the total iron content. Iron catalysts with so high a reduction value bring about a formation of oxygen-containing compounds and quite particularly alcohols amounting to the 4 or 5-fold of the formation obtainable with catalysts of lower reduction value containing for instance only 40 to 45% free iron.

The raising of the reduction value of the iron catalysts, besides resulting in a higher yield of oxygen-containing compounds, also enables the temperature in the hydrogenation zone to be reduced by approximately 15 to 20° C., provided the hydrogenation of the carbon monoxide is carried through with the usual passage of 100 parts by volume of the gas mixture per hour for one part by volume of the catalyst. At the same time the boiling temperature of the products of the reaction is influenced by the process, when operating with iron catalysts of high reduction value. Although the working temperature is lower than the normal temperature in the synthetic process, the yield of organic products boiling above 320° C. remains low. Surprisingly, when operating according to this invention, the percentage of oxygen-containing compounds is materially greater. Iron catalysts with normal reduction value as a rule produce at a pressure ranging between 10 and 20 kg./sq. cm. a high percentage of hydrocarbons, most of which often boil above 320° C.

In order to obtain high yields of alcohols and esters, it is useful to carry out the usual reducing treatment of the catalyst with hydrogen, carbon monoxide or mixtures of these gases at high gas velocities and at a temperature ranging between about 270 and 300° C. In this case the synthetical treatment then following with the gas mixture passing right through the catalyst, already at a temperature of about 200 to 210° C. leads to a conversion between CO and $H_2$ averaging 60 to 65 percent, which corresponds to a conversion of CO alone of approximately 80 to 88%.

In contrast to the gas velocities of about 2 to 40 cm./sec. hitherto used in the reduction of iron catalysts, the reduction of the catalyst according to the present invention is carried through with the gas traveling at the rate of 50 to 500 cm./sec. and preferably with gas velocities of 100 to 200 cm./sec.

When operating in this manner, the height of the catalyst layer can be raised materially beyond the height of the layer in the reduction apparatuses hitherto used. With the low gas velocities at present in use and layers of the catalyst about 100 cm. high considerable differences in the reduction value arise between the top and the bottom sections of the layers. These differences will not disappear, even if the reduction period is materially extended, and this fact has hitherto influenced very unfavorably the utility of iron catalysts in the synthetic process.

By operating with a materially raised velocity of the reduction gases according to this invention, one obtains within a short period of time, for instance after 30 minutes, practically equal reduction values near the top and near the bottom of a catalyst layer 100 cm. high. The height of the catalyst layer may even be increased further, so that this way of proceeding in the preliminary reducing treatment of the catalyst is very favorable from the economical point of view.

As compared with catalysts reduced at a low gas velocity, the iron catalysts subjected to the preliminary treatment with a high gas velocity according to this invention, offer the advantage that in the process of hydrogenation of carbon monoxide the reaction temperature may be materially lowered without impairing the performance. As is well known, as the hydrogenation of carbon monoxide proceeds, the iron catalysts require the reaction temperature to be raised gradually. In view of this circumstance the lower starting temperature according to this invention, when reducing the iron catalyst, affords the advantage of a greater difference for the utilization of the catalyst, a fact which is of great importance for the lengthening of the life of the catalyst.

The possibility of lowering the reaction temperature is also very advantageous for the reason that the lower temperature favors the formation of carbon compounds containing oxygen.

In contrast to other iron catalysts producing greater quantities of alcohol and similar oxygen compounds, the use of the new catalysts according to this invention leads to a reduction in the formation of methane. In the hydrogenation of carbon monoxide in the presence of iron catalysts as hitherto performed, a conversion of 55 to 66% $CO+H_2$ passing right through the catalyst leads to the formation of 10 to 15% methane. If proceeding in accordance with this invention, the percentage of methane formed during the conversion of 60 to 65% $CO+H_2$ can be reduced to 5% or even below that value.

I found it particularly favorable to employ a gas mixture as rich in carbon monoxide as possible, for a high content of hydrogen greatly favors the formation of hydrocarbons, while a gas mixture rich in carbon monoxide also leads to an increased production of high molecular compounds.

I obtained high yields more especially in the case where the synthetic process was carried out at temperatures increasing gradually in the direction of the gas flow. In contrast to the hydrogenation of carbon monoxide hitherto carried out in water-cooled reaction furnaces, in which conversion mainly takes place in the upper third of the catalyst layer, temperatures in the catalyst increasing in the direction of gas flow lead to uniformly high conversions throughout the catalyst layer. The increase of temperature in the direction of the gas flow can be obtained in a well known manner with the aid of special coolants or by zone-wise cooling of the furnace.

I have found it particularly advantageous to operate the synthetical process when using catalysts according to this invention, with the gases repeatedly circulating through the catalyst. In this case the yield of compounds containing oxygen is distinctly higher than if the gases are passed straight through the catalyst.

I have further found that the loading of the catalyst with gas, which hitherto usually amounted to 100 volumes per hour of the gas contacting one volume of the catalyst, can be increased far below this proportion. Of course, in order to obtain similar performances, the temperature in the reaction zone will have to be raised accordingly. In the preliminary treatment of iron catalysts as hitherto performed, a raising of the reaction temperature practically always led to a great increase in the formation of methane and under certain circumstances so much methane may form that the synthetical reaction becomes uneconomical. In contrast to this, the new iron catalysts keep the formation of methane within economical limits, even if the gas load of the catalyst is increased.

In view of an operation under the best catalytic conditions care must be taken to keep the gases used in the preliminary reduction treatment as free as possible from noxious impurities.

In the operation of this invention I have for instance proceeded as follows:

Example 1

The hydrogenation of carbon monoxide was performed in the presence of a catalyst consisting of 100 parts by weight iron and 5 parts copper. This catalyst was obtained by precipitating a hot solution of the corresponding metal nitrates with sodium carbonates, the precipitate then being substantially freed from the residual alkali by washing. The precipitate was then impregnated with potassium phosphate ($KH_2PO_4$) in such manner that 7.9 parts $K_2O$ were present per 100 parts iron.

The synthetic process was carried through under a pressure of 10 kg./sq. cm. at a temperature of 205° C., the gas under treatment being a water gas containing 50 parts by volume of hydrogen, 40 parts carbon monoxide and 10 parts other gases. Through 1 part by volume of the catalyst were passed hourly 100 parts of the gas mixture (calculated for atmospheric pressure). The conversion of CO and H amounted to 61% and 4.5% methane were formed at the same time. The liquid reaction products contained an average of 23% alcohols, 17% esters and 4% of other oxygen-containing compounds, the remainder being hydrocarbons. 57% of the liquid products of the synthetical process boiled at 320° C.

Example 2

A catalyst containing 100 parts iron, 25 parts copper, 20 parts chromium oxide ($Cr_2O_3$) and 20 parts kieselgur, which had been produced by precipitating a hot solution of the corresponding metal nitrates with a hot solution of sodium carbonate and had been thoroughly washed to remove the residual alkali, was impregnated with 2 parts K₂O (calculated for the iron present) in the form of potassium tungstate (K₂WO₄). This catalyst was first subjected during 3 hours at 300° C. to a reduction treatment with hydrogen flowing at the rate of 1.5 met./sec., its final reduction value amounting to 85% free iron.

When water gas was conducted through this catalyst at a pressure in the reaction zone of 20 kg./sq. cm., the conversion at 211° C. of CO—H₂ amounted to 65–70%. The reaction product contained a high percentage of oxygen compounds. In the fraction boiling between 110 and 136° C. 50%, in the fraction boiling between 160 and 182° C. also 50% and in the fraction boiling between 242 and 260° C. about 40% oxygen compounds were present. Approximately 25% of the entire liquid products boiled above 320° C.

An iron catalyst produced in the same manner, but in consequence of a shorter reduction period and lower reduction temperature possessing only a reduction value of 40%, in order to reach the same performance, requires a reaction temperature of 228° C. The liquid products of the reaction with the fractions mentioned above only reached one-fourth or one-fifth of the content of oxygen compounds mentioned above and the content of compounds boiling above 320° C. amounted to 45% of the liquid products of the conversion.

A further lowering of the percentage of products boiling above 320° C. could be obtained by using instead of kieselgur as a carrier for the catalyst some other material, for instance active alumina. This change resulted in a reduction of the yield of products boiling at 320° C. to about 12%, as compared to the 25% produced with kieselgur as a carrier.

*Example 3*

A catalyst composed of 100 parts iron, 15 parts copper, 5 parts calcium oxide (CaO) and 15 parts kieselgur was precipitated in the usual manner with sodium carbonate from the corresponding nitrate solutions. During the first precipitation an alkaline reaction was maintained throughout. After filtering and washing the catalyst mass was impregnated with potassium borate in such manner that per 100 parts by weight iron, 9 parts K₂O and 3.2 parts H₂BO₃ were present. After drying the catalyst was reduced 90 minutes at 305° C. with hydrogen flowing at the rate of 1.5 m./sec. (linear flow) at low temperature. The catalyst then contained 76% free iron, calculated for the total iron content.

This catalyst was used in the synthetical conversion of water gas at 190° C. under a pressure of 20 kg./sq. cm., the process being so conducted that 100 parts by volume of the gas were passed through one part by volume of the catalyst, the gas being conducted in a cycle in such manner that one part by volume of fresh gas was added to every two parts of returning gas. When operating under these conditions, a conversion of 61% CO+H₂ was obtained, the products containing about 55% by weight of oxygen compounds, mostly alcohols.

*Example 4*

An iron catalyst containing 100 parts iron, 5 parts copper, 10 parts calcium oxide (CaO) and 10 parts kieselgur was precipitated in the usual manner with a soda solution from the solution of the corresponding metal nitrates at a pH value of about 9. After washing, the filtered catalyst mass was impregnated with potassium waterglass in such manner that 8 parts by weight K₂O and 4 parts SiO₂ were present for 100 parts iron. After drying, the catalyst was reduced 60 minutes at 300° C. with hydrogen flowing at a linear velocity of 1.4 m./sec. This catalyst had a reduction value of 63% free iron, calculated for the entire iron content.

When this catalyst was used in the synthetical process at 195° C. and under a pressure of 10 kg./sq. cm. of water gas, 100 parts by volume of the gas being hourly passed across one part of the catalyst, a performance of 55% (CO+H₂) could be obtained. The liquid products formed in the process contained about 60% oxygen compounds, mostly alcohols.

If the same catalyst was loaded hourly at 220° C. with 400 parts by volume of the gas per one part of the catalyst, while the pressure was raised to 15 kg./sq. cm., a conversion of 50% (CO+H₂) was obtained and the liquid products in this case contained approximately 55% oxygen compounds, also mostly alcohols.

Various changes may be made in the steps of the process described and in the proportions and nature of the reacting products, without departing from the invention or sacrificing the advantages thereof.

I claim:

1. A process for catalytic hydrogenation of carbon monoxide at temperatures between about 190° C. and 320° C. and pressures between 10 and 50 atmospheres in the presence of an iron catalyst prepared by precipitation and containing an alkali compound of an inorganic non-volatile acid, the alkali content of said alkali compound ranging from .5–10% calculated for K₂O of the weight of the total iron content, said catalyst having been subjected to the action of a reducing gas at a temperature of 200° C. to 320° C. and a gas velocity of 50 to 500 cm. per second until the free iron content of the catalyst is at least 60% of the total iron content thereof, comprising reacting said carbon monoxide and hydrogen in the presence of said reduced catalyst and at temperatures within said limits to produce a high yield of product having at least 40% of oxygenated compounds therein.

2. The process of claim 1 wherein the catalyst is subjected to the action of the reducing gas until the free iron content of the catalyst is at least 80% of the total iron content.

WALTER ROTTIG.

References Cited in the file of this patent

UNITED STATES PATENTS

| Number | Name | Date |
|---|---|---|
| 1,268,692 | Dewar et al. | June 4, 1918 |
| 1,963,119 | Dreyfus | June 19, 1934 |
| 2,254,806 | Michael | Sept. 2, 1941 |
| 2,257,457 | Fischer et al. | Sept. 30, 1941 |
| 2,287,891 | Linckh | June 30, 1942 |
| 2,426,829 | Kearby | Sept. 2, 1947 |
| 2,461,147 | Davies et al. | Feb. 8, 1949 |
| 2,500,331 | Voorhees | Mar. 14, 1950 |